US012677980B2

(12) United States Patent   (10) Patent No.:   US 12,677,980 B2

Guo et al.   (45) Date of Patent:   Jul. 14, 2026

(54) COFFEE BREWING SYSTEM AND COFFEE MACHINE

(71) Applicant: GUANGDONG BAISHENGTU TECHNOLOGY CO., LTD., Foshan (CN)

(72) Inventors: Jiangang Guo, Foshan (CN); Jun You, Foshan (CN); Yongchun Zeng, Foshan (CN)

(73) Assignee: GUANGDONG BAISHENGTU TECHNOLOGY CO., LTD, Foshan (CN)

( * ) Notice: Subject to any disclaimer, the term of this patent is extended or adjusted under 35 U.S.C. 154(b) by 854 days.

(21) Appl. No.: 18/009,062

(22) PCT Filed: Oct. 12, 2020

(86) PCT No.: PCT/CN2020/120422

§ 371 (c)(1),
(2) Date: Dec. 8, 2022

(87) PCT Pub. No.: WO2022/021609

PCT Pub. Date: Feb. 3, 2022

(65) Prior Publication Data

US 2023/0248174 A1   Aug. 10, 2023

(30) Foreign Application Priority Data

Jul. 29, 2020   (CN) .......................... 202021540022.4

(51) Int. Cl.
*A47J 31/36*   (2006.01)
*A47J 31/44*   (2006.01)
(Continued)

(52) U.S. Cl.
CPC ....... *A47J 31/3614* (2013.01); *A47J 31/3619* (2013.01); *A47J 31/4403* (2013.01); *A47J 31/461* (2018.08); *A47J 31/525* (2018.08)

(58) Field of Classification Search
CPC . A47J 31/3609; A47J 31/3614; A47J 31/3619
See application file for complete search history.

(56) References Cited

U.S. PATENT DOCUMENTS 6,116,147 A * 9/2000 Schmed .............. A47J 31/3614
99/287
2014/0041527 A1* 2/2014 Verhoeven .......... A47J 31/3614
99/297

FOREIGN PATENT DOCUMENTS

CN   105476485 A * 4/2016 .............. A47J 31/44
CN   205514121 U   8/2016
EP   0073739 A1 * 3/1983 .......... A47J 31/3614

OTHER PUBLICATIONS

CN 105476485 A (Guo, Jian-gang et al.) Apr. 13, 2016 [retrieved on Nov. 1, 2025]. Retrieved from Foreign Image and Text database, translation by Clarivate Analytics. (Year: 2016).*
(Continued)

*Primary Examiner* — John J Norton

(57)   ABSTRACT

A coffee brewing system and a coffee machine including a body, a brew head assembly, a brewing cavity assembly, and a driving device; the body has an inner cavity; the brew head assembly is fixed at one end of the inner cavity; the brewing cavity assembly has a brewing cavity and a powder pusher assembly; the brewing cavity is movably disposed in the inner cavity and is in transmission connection with the driving device; two opposite ends of the brewing cavity are respectively provided with a first opening and a second opening communicated with the interior of the brewing cavity; the first opening is opposite to the brew head assembly; the top of the brewing cavity is provided with a
(Continued)

first powder receiving port communicated with the brewing
cavity.

19 Claims, 8 Drawing Sheets

(51)  Int. Cl.
    *A47J 31/46*        (2006.01)
    *A47J 31/52*        (2006.01)

(56)                References Cited

OTHER PUBLICATIONS

EP 0073739 A1 (Rais, Arnold) Mar. 9, 1983 [retrieved on Nov. 1,
2025]. Retrieved from Foreign Image and Text database, translation
by Clarivate Analytics. (Year: 1983).*

* cited by examiner

COFFEE BREWING SYSTEM AND COFFEE MACHINE

TECHNICAL FIELD

This invention generally relates to the technical field of household appliances, and more particularly, to a coffee brewing system and a coffee machine.

BACKGROUND

When brewing coffee, a coffee machine often needs to perform powder grinding, pressing, feeding, brewing and residue removal. Due to the complex process, conventional coffee machines are provided with a plurality of motion tracks in its brewing system for completing the aforesaid steps. For example, Chinese patent CN205514121U discloses an automatic coffee brewing device, which comprises a body, wherein an inner cavity is formed in the body, and one end of the inner cavity is provided with a brewing cavity. The brewing cavity is propelled to move left and right by a driving device. Another end of the inner cavity is provided with a hydraulic cylinder, the hydraulic cylinder is provided with a piston, and the piston is provided with a flow channel for supplying water to the brewing cavity. The piston is arranged relative to the brewing cavity, and a control circuit board is respectively connected to the driving device and the hydraulic cylinder for controlling the action of the driving device and the hydraulic cylinder. Thus, the brewing cavity and the hydraulic cylinder is propelled to move in opposite directions to complete the brewing process. The aforesaid coffee brewing device has a complex structure, high cost and low stability.

SUMMARY

The purpose of the present invention is to provide a coffee brewing system and a coffee machine with a simple structure, low cost and high stability.

To achieve the above purpose, the present invention adopts the following technical solution: a coffee brewing system comprises a body, a brew head assembly, a brewing cavity assembly, and a driving device; the body has an inner cavity, and the brew head assembly is fixed at one end of the inner cavity; the brewing cavity assembly comprises a brewing cavity and a powder pusher assembly; the brewing cavity is movably arranged in the inner cavity and is in transmission connection with the driving device; two opposite ends of the brewing cavity are respectively provided with a first opening and a second opening communicated with the interior of the brewing cavity; the first opening is opposite to the brew head assembly, and the top of the brewing cavity is provided with a first powder receiving port communicated with the brewing cavity; the powder pusher assembly has one end extending into the brewing cavity from the second opening, and the other end extending out of the brewing cavity and connected to the body; the powder pusher assembly and the body may be locked to or unlocked from each other; along the moving direction, the brewing cavity in the inner cavity is provided with a first position for discharging coffee residue, a second position for receiving powder, and a third position for brewing coffee; in the first position, one end of the powder pusher assembly abuts against the first opening, in the second position, the brewing head assembly abuts against the first opening, and in the third position, the brewing head assembly extends into the brewing cavity and abuts against the powder pusher assembly; the coffee brewing system has a simple structure and achieves low cost and high stability.

In another embodiment of the present invention, when the brewing cavity moves between the first position and the second position, the powder pusher assembly and the body are locked to each other. When the brewing cavity moves between the second position and the third position, the brewing cavity propels the powder pusher assembly to move such that the powder pusher assembly and the body are unlocked from each other.

In another embodiment of the present invention, the coffee brewing system further comprises a sliding pull rod assembly. The sliding pull rod assembly comprises a fixing frame and a pull rod, wherein the fixing frame is fixedly connected to the body, the pull rod is connected to another end of the powder pusher assembly and is slidably connected to the fixing frame. The pull rod and the fixing frame may be locked to or unlocked from each other. Through the locking and unlocking between the pull rod and fixing frame, the powder pusher assembly and the body are locked to or unlocked from each other in time.

In another embodiment of the present invention, one of the fixing frame and the pull rod is provided with an elastic locking pin, and the other of the fixing frame and the pull rod is provided with a locking groove. When the pull rod slides relative to the fixing frame to enable the locking pin to extend into the locking groove, the locking pin and the locking groove are locked to each other. When the pull rod is pulled by the powder pusher assembly, the elastic locking pin escapes from the locking groove such that the locking pin and the locking groove are unlocked from each other. Through the locking and unlocking between the elastic locking pin and locking groove, the pull rod and fixing frame are locked to or unlocked from each other, achieving a simple structure and high stability.

In another embodiment of the present invention, the driving device is in transmission connection with the brewing cavity through a lead screw assembly. The lead screw assembly comprises a nut and a lead screw that are meshed with each other. The nut is arranged in the inner cavity and is in transmission connection with the driving device, and the lead screw is arranged in the inner cavity and connected to the brewing cavity. When the driving device propels the nut to rotate in the inner cavity, the lead screw is propelled to linearly move in the inner cavity, thereby propelling the brewing cavity to move linearly in the inner cavity. The screw assembly has a simple structure and is capable of stably propelling the brewing cavity to move linearly.

In another embodiment of the present invention, a lead screw cavity penetrating through two ends of the lead screw is formed in the lead screw. The fixing frame and the pull rod are arranged in the lead screw cavity. One end of the fixing frame extends out from one end of the lead screw cavity and is fixedly connected to the body, and another end of the powder pusher assembly extends into the lead screw cavity and is connected to the pull rod. Through arranging the lead screw cavity in the lead screw, the sliding pull rod assembly is conveniently arranged in the lead screw. Thus, the structure of the coffee brewing system becomes compact, the space occupation is reduced, and the size of the coffee machine becomes smaller.

In another embodiment of the present invention, the powder pusher assembly comprises a first piston portion and a rod portion. The first piston portion is arranged in the brewing cavity. The diameter of the first piston portion is greater than that of the second opening. One end of the rod portion extends into the brewing cavity and is connected to the first piston portion, and the other end of the rod portion extends out of the brewing cavity and is connected to the body. When the brewing cavity moves from the second position to the third position, through the interaction between the brewing cavity and the first piston portion, the powder pusher assembly is propelled to move along with the brewing cavity. When the brewing cavity moves from the third position to the second position, under the frictional force between the brewing cavity and the first piston portion, the powder pusher assembly moves along with the brewing cavity.

In another embodiment of the present invention, the powder pusher assembly is provided with a liquid outlet channel. An inlet of the liquid outlet channel is formed in an end surface of the first piston portion facing the brewing head assembly, and an outlet of the liquid outlet channel is formed in the circumferential surface of the rod portion. Sealing rings are respectively arranged on the two sides of the outlet of the liquid outlet channel on the rod portion, and the brewing cavity is provided with a liquid outlet. When the brewing cavity moves to the third position, the outlet of the liquid outlet channel directly faces the liquid outlet, and the sealing rings abut against the wall of the brewing cavity. A sealing cavity is formed among the outer peripheral surface of the rod portion, the wall of the brewing cavity and the two sealing rings. Through adopting the aforesaid design, the liquid coffee may flow out through the liquid outlet formed in the brewing cavity, thus preventing the liquid coffee from spilling.

In another embodiment of the present invention, a one-way valve is arranged in the liquid outlet channel, and when the liquid pressure between the brewing head assembly and the powder pusher assembly reaches a preset threshold value, the one-way valve is opened, which allows the liquid coffee to flow out through the liquid outlet channel. In this way, the coffee is brewed under a high pressure such that the brewing effect and the brewing speed are improved while preventing the liquid coffee from flowing back to the brewing cavity.

In another embodiment of the present invention, the coffee brewing system further comprises a controller electrically connected to the driving device and sensors arranged to respectively correspond to the first position, the second position, and the third position. When the brewing cavity moves to the first position, the second position or the third position, the corresponding sensor sends a sensing signal to the controller, so that the driving device is turned off by the controller. Through the arrangement of the controller and the sensors, the brewing process is automatically completed by the coffee brewing system, significantly improving the user experience.

In another embodiment of the present invention, the top of the body is provided with a second powder receiving port communicated with the inner cavity. The top of the body is provided with a powder blocking plate, and a third powder receiving port is formed in the powder blocking plate. When the brewing cavity moves, the powder blocking plate moves along with the brewing cavity, and when the brewing cavity moves to the second position, the third powder receiving port is opposite to the second powder receiving port and the first powder receiving port. After the brewing cavity is moved away from the second position, the powder blocking plate blocks the second powder receiving port, thereby preventing the coffee powder from caking due to the steam entering the powder discharging channel of the coffee machine through the first powder receiving port during in the brewing process.

The present invention also provides a coffee machine having a coffee brewing system of any aforesaid embodiments. The structure of the coffee brewing system is simple, the cost is low and the stability is high. The coffee machine having the aforesaid coffee brewing system possesses these merits as well.

Compared with the prior art, the present invention has the following advantages:

Through adopting the coffee brewing system with the aforesaid structure, after propelling the brewing cavity to reciprocate once by the driving device, a coffee brewing process is completed. In this process, by means of the locking or unlocking between the powder pusher assembly and the body, the powder pusher assembly moves or does not move along with the brewing cavity. Thus, operations such as powder feeding, powder pressing, brewing and residue removal are performed conveniently. The structure is simple, the cost is low, and the stability is high.

MARKING INSTRUCTIONS IN FIGURES

Figure 1:
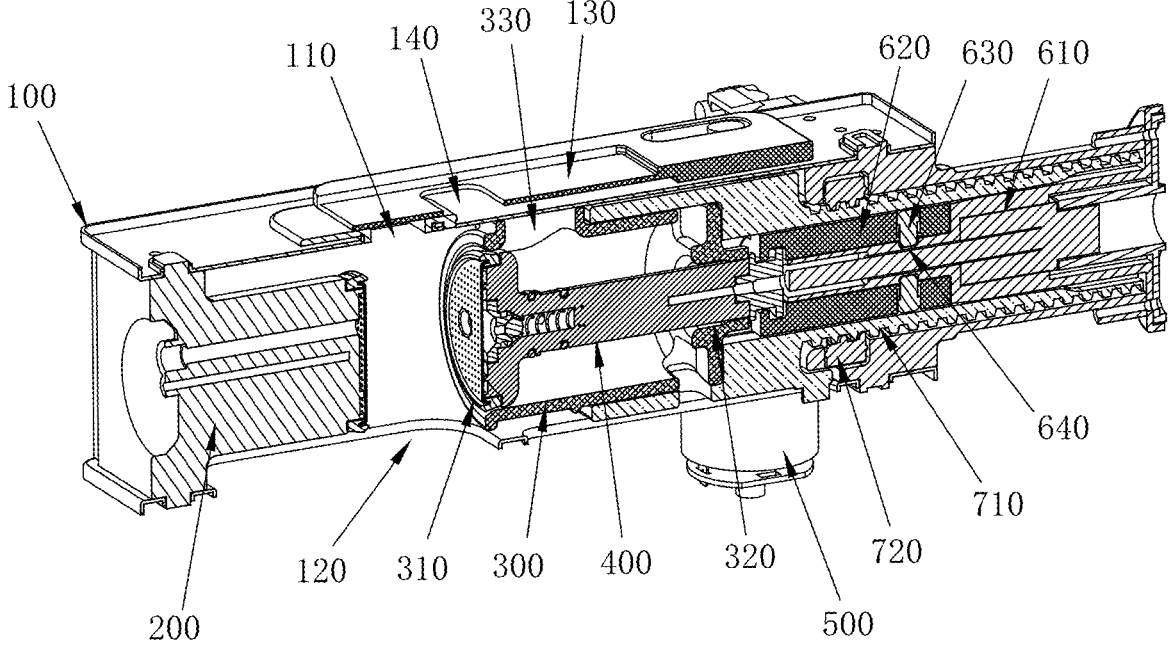
FIGS. 1-3 are respectively conceptual diagrams illustrating a sectional view of the coffee brewing system of the present invention when the brewing cavity is located at a first position, a second position and a third position.

100—Body, 110—The First Powder Receiving Port, 120—Residue Discharging Port, 130—Powder Blocking Plate, 140—The Third Powder Receiving Port, 200—Brewing Head Assembly, 210—The Second Piston Portion, 220—Hot Water Channel, 230—The Second Filter Screen, 300—Brewing Cavity, 310—The First Opening, 320—The Second Opening, 330—The Second Powder Receiving Port, 340—Liquid Outlet, 400—Powder Pusher Assembly, 410—The First Piston Portion, 420—Rod Portion, 430—The First Filter Screen, 440—Liquid Outlet Channel, 450—Sealing Ring, 460—One-way Valve, 461—Sealing Member, 462—Ball Valve, 463—Spring, 500—Driving Device, 600—Sliding Pull Rod Assembly, 610—Fixing Frame, 620—Pull Rod, 621—The Second Connecting Portion, 630—Elastic Locking Pin, 640—Locking Groove, 700—Lead Screw Assembly, 710—Lead Screw, 711—Lead Screw Cavity, 712—The First Connecting Portion, 720—Nut, 800—Sensor.

DETAILED DESCRIPTION

To allow those skilled in the art to better understand the present invention, drawings and detailed embodiments are combined hereinafter to elaborate the technical solution of the present invention.

The present invention provides a coffee brewing system for a powder coffee machine. Referring to FIGS. 1-6, the coffee brewing system comprises a body 100, a brew head assembly 200, a brewing cavity assembly, and a driving device 500. The body 100 has an inner cavity, and the brew head assembly 200 is fixed at one end of the inner cavity. The brewing cavity assembly comprises a brewing cavity 300 and a powder pusher assembly 400. The brewing cavity 300 is movably arranged in the inner cavity and is in transmission connection with the driving device 500. The brewing cavity 300 is capable of moving in the inner cavity when being propelled by the driving device 500, and the brewing cavity 300 is internally provided with a brewing space. Two opposite ends of the brewing cavity 300 are respectively provided with a first opening 310 and a second opening 320 communicated with the interior of the brewing cavity 300. The first opening 310 is opposite to the brew head assembly 200, and the top of the brewing cavity 300 is provided with a first powder receiving port 330 communicated with the brewing cavity 300. The powder pusher assembly 400 has one end extending into the brewing cavity 300 from the second opening 320, and the other end extending out of the brewing cavity 300 and connected to the body 100. The powder pusher assembly 400 and the body 100 may be locked to or unlocked from each other.

Along the moving direction, the brewing cavity 300 in the inner cavity is provided with a first position for discharging coffee residue, a second position for receiving powder, and a third position for brewing coffee. In the first position, one end of the powder pusher assembly 400 abuts against the first opening 310, in the second position, the brewing head assembly 200 abuts against the first opening 310, and in the third position, the brewing head assembly 200 extends into the brewing cavity and abuts against the powder pusher assembly 400. In some embodiments, the top and the bottom of the body 100 are respectively provided with a second powder receiving port 110 and a residue discharging port 120 in communication with the inner cavity. In some embodiments, the second powder receiving port 110 may be connected to a powder discharging channel of the coffee machine, and a residue receiving device may be arranged below the residue discharging port 120. When the brewing cavity 300 moves between the first position and the second position, the powder pusher assembly 400 and the body 100 are locked to each other. When the brewing cavity 300 moves between the second position and the third position, the brewing cavity 300 propels the powder pusher assembly 400 to move such that the powder pusher assembly 400 and the body 100 are unlocked from each other.

The first position may be an initial position of the brewing cavity 300. Referring to FIGS. 1-4, when brewing coffee, the driving device 500 propels the brewing cavity 300 to move towards the brewing head assembly 200, thereby enabling the brewing cavity 300 to move from the first position to the second position. Because the powder pusher assembly 400 and the body 100 are locked to each other, during this process, the powder pusher assembly 400 does not move along with the brewing cavity 300, and one end of the powder pusher assembly 400 gradually moves from the first opening 310 to the second opening 320.

Figure 2:
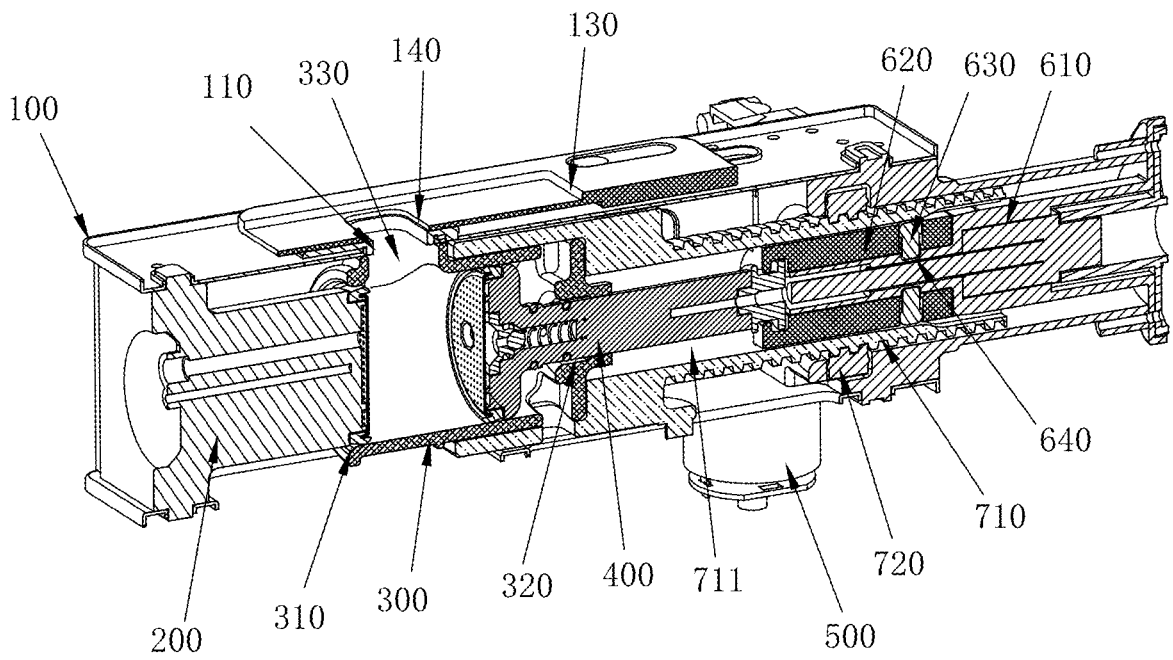
Figure 5:
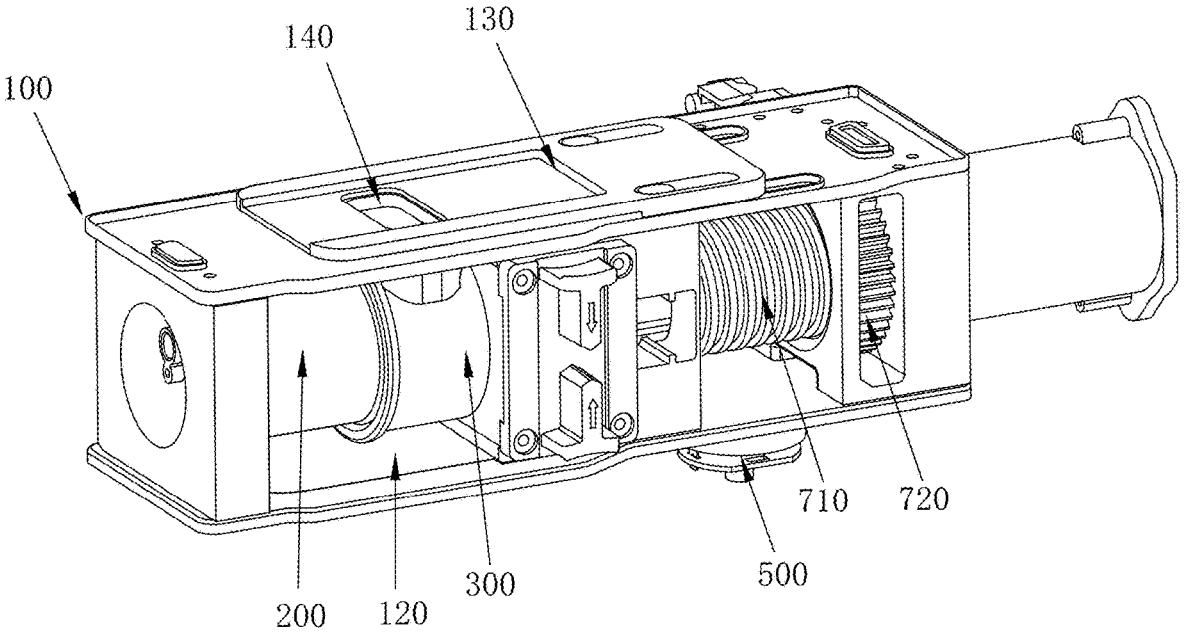

When the brewing cavity 300 moves to the second position, referring to FIGS. 2 and 5, one end of the powder pusher assembly 400 moves to a position close to the second opening 320, and one end of the brewing head assembly 200 abuts against the first opening 310. At this point, the first powder receiving port 330 is opposite to the second powder receiving port 110, which allows the coffee powder in the powder discharging channel to fall into the brewing cavity through the second powder receiving port 110 and the first powder receiving port 330, thereby completing the powder feeding process.

Figure 3:
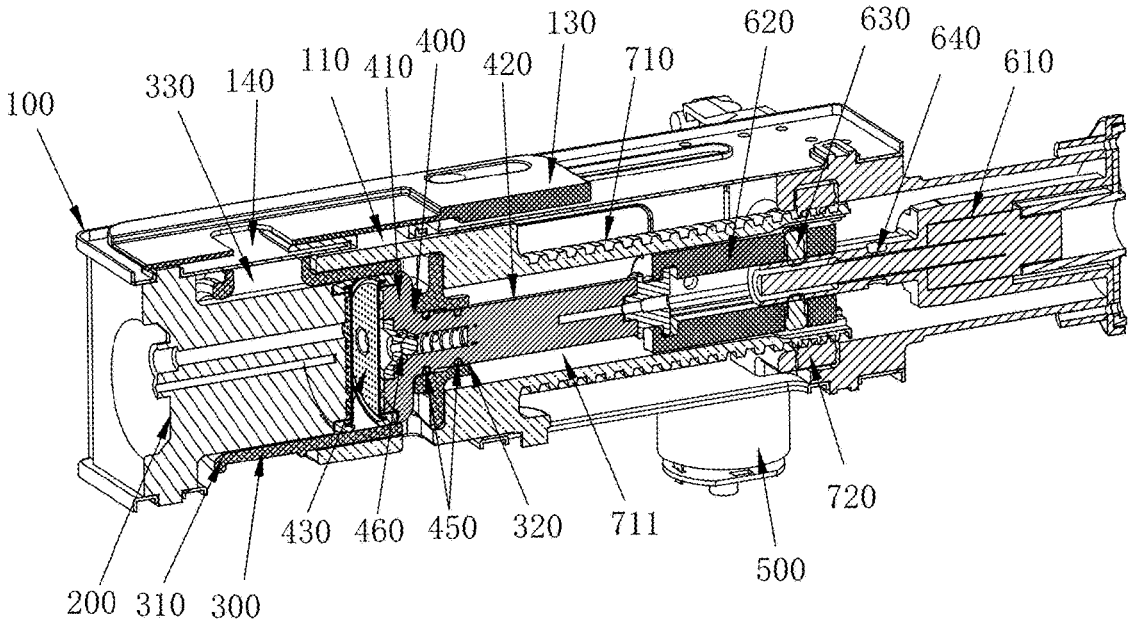
Figure 6:
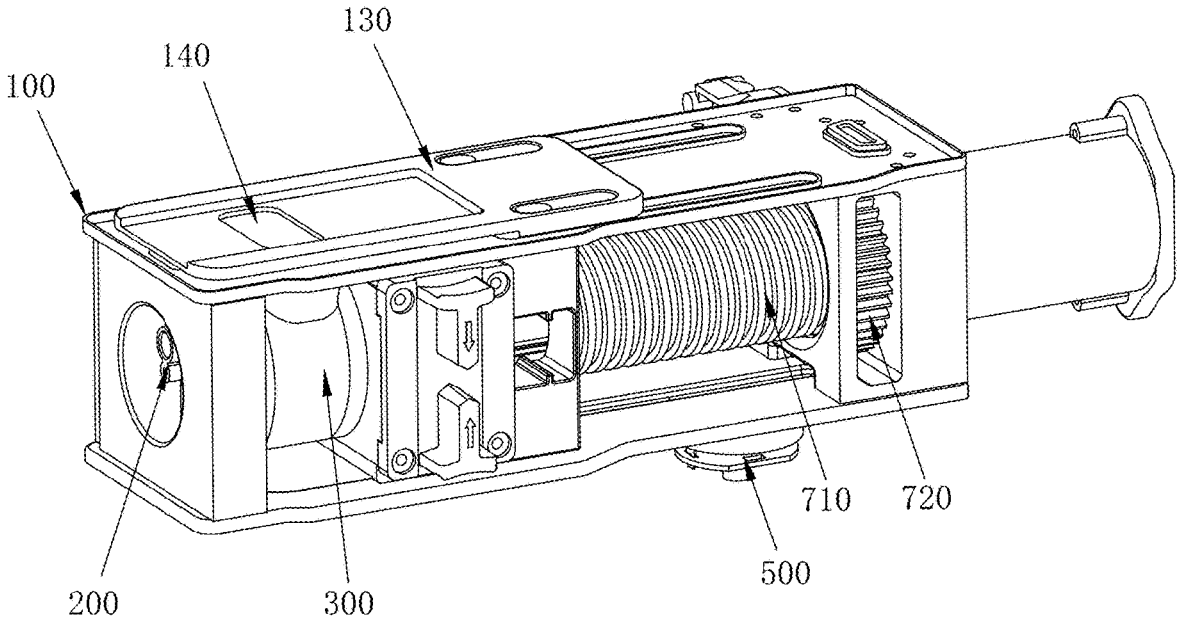

Subsequently, the driving device 500 continuously propels the brewing cavity 300 to move towards the brewing head assembly 200, which enables the brewing cavity to move from the second position to the third position. The brewing cavity 300 further propels the powder pusher assembly 400 and the body 100 to be unlocked from each other, thus making the powder pusher assembly 400 move towards the brewing head assembly 200 along with the brewing cavity 300. At this point, the brewing head assembly 200 gradually extends into the brewing cavity, and when the brewing head assembly 200 gradually approaches the powder pusher assembly 400, the brewing head assembly 200 presses the coffee powder in the brewing cavity until the brewing cavity 300 moves to the third position. Referring to FIGS. 3 and 6, hot water is then fed into the pressed coffee powder for brewing coffee.

After the brewing is completed, the driving device 500 propels the brewing cavity 300 to return to the second position from the third position. In this process, the brewing head assembly 200 gradually escapes from the brewing cavity, and the powder pusher assembly 400 moves along with the brewing cavity 300 until the brewing cavity 300 reaches the second position. At this point, the powder pusher assembly 400 and the body 100 are re-locked to each other. When the brewing cavity 300 moves towards the first position, the powder pusher assembly 400 does not move any more. One end of the powder pusher assembly 400 gradually approaches the first opening 310, which is capable of continuously pushing the coffee residue in the brewing cavity to the first opening 310. When the brewing cavity 300 returns to the first position, the first opening 310 abuts against the residue discharging port 120, and one end of the powder pusher assembly 400 abuts against the first opening 310. In this way, the coffee residue in the brewing cavity is pushed out from the brewing cavity to fall into the residue receiving device through the residue discharging port 120. Therefore, a coffee brewing process is completed.

Through adopting the coffee brewing system with the aforesaid structure, after propelling the brewing cavity 300 to reciprocate once by the driving device 500, a coffee brewing process is completed. In this process, by means of the locking or unlocking between the powder pusher assembly 400 and the body 100, the powder pusher assembly 400 moves or does not move along with the brewing cavity 300. Thus, operations such as powder feeding, powder pressing, brewing and residue removal are performed conveniently. The structure is simple, the cost is low, and the stability is high.

Figure 8:
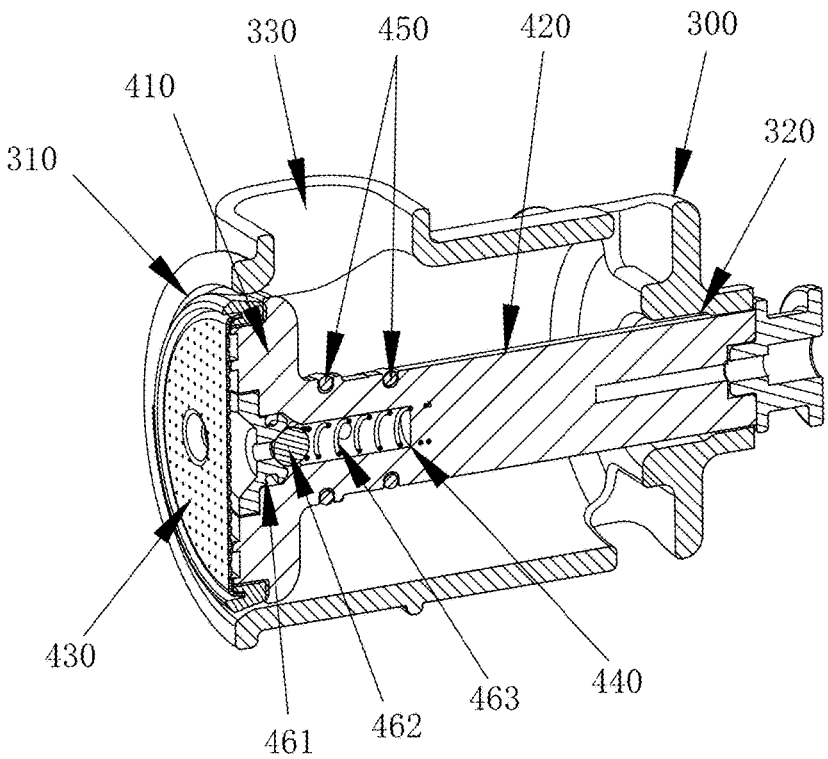
FIG. 8 is a conceptual diagram illustrating a sectional view of the brewing cavity assembly of the present invention.
Figure 9:
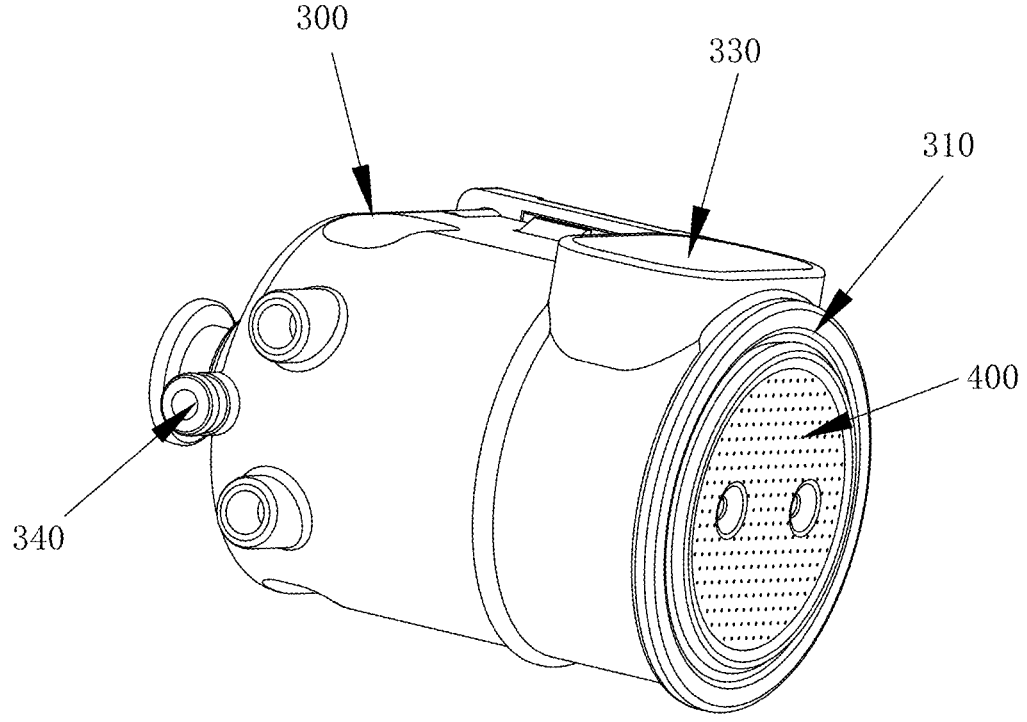
FIG. 9 is a conceptual diagram illustrating a three-dimensional structure of the brewing cavity assembly of the present invention.

Referring to FIGS. 3, 8 and 9, in some embodiments, the powder pusher assembly 400 comprises a first piston portion 410 having a larger diameter and a rod portion 420 having a smaller diameter. The diameter of the second opening 320 is smaller than the diameter of the first piston portion 410 and greater than the diameter of the rod portion 420. The first piston portion 410 is arranged in the brewing cavity, wherein one end of the rod portion 420 extends into the brewing cavity through the second opening 320 and is connected to the first piston portion 410, and the other end of the rod portion 420 extends out of the brewing cavity and is connected to the body 100. When the brewing cavity 300 moves from the first position to the second position, the frictional force between the brewing cavity 300 and the first piston portion 410 is too weak to enable the powder pusher assembly 400 to be unlocked from the body 100. At this point, the first piston portion 410 does not move along with the brewing cavity 300, and the first piston portion 410 moves from the first opening 310 to the second opening 320. When the brewing cavity 300 moves to the second position, the first piston portion 410 moves to a position close to the second opening 320. Because the first piston portion 410 cannot escape from the second opening 320, when the brewing cavity 300 moves to the third position, the brewing cavity 300 pulls the powder pusher assembly 400 such that the powder pusher assembly 400 is unlocked from the body 100 and moves along with the brewing cavity 300. When the brewing cavity 300 returns to the second position from the third position, under the action of the frictional force, the first piston portion 410 moves along with the brewing cavity 300, and when the brewing cavity 300 reaches the second position, the powder pusher assembly 400 and the body 100 are locked to each other again. When the brewing cavity 300 moves from the second position to the first position, the first piston portion 410 does not move along with the brewing cavity 300, and the first piston portion 410 moves to the first opening 310 from the second opening 320, thereby pushing the coffee residue out.

Figure 10:
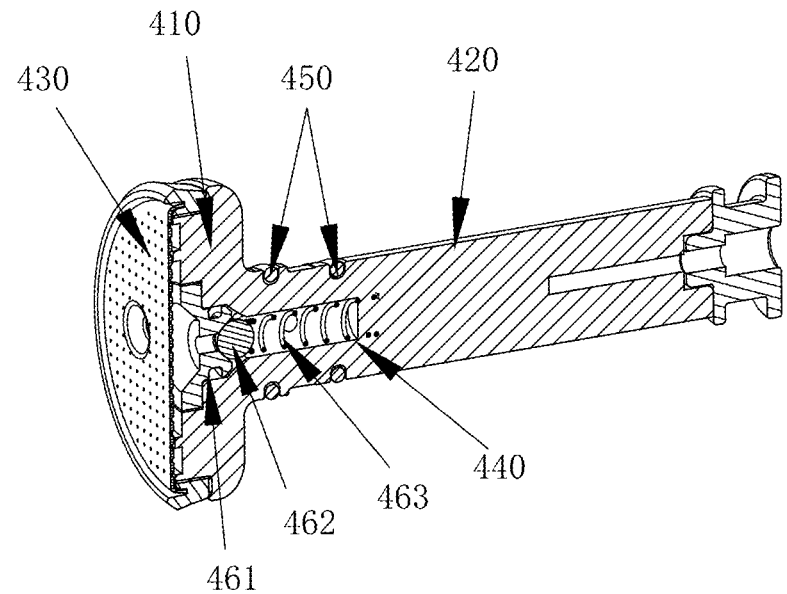
FIG. 10 is a conceptual diagram illustrating a sectional view of the powder pusher assembly of the coffee brewing system of the present invention.

Referring to FIGS. 8-10, in some embodiments, the powder pusher assembly 400 is provided with a liquid outlet channel 440. An inlet of the liquid outlet channel 440 is formed in an end surface of the first piston portion 410 facing the brewing head assembly 200, and a first filter screen 430 is fixed to the end surface by means of, for example, a piston sealing ring 450 for sealing the inlet of the liquid outlet channel 440. The liquid outlet channel 440 extends into the rod portion 420 from the first piston portion 410, and an outlet of the liquid outlet channel 440 is formed in the circumferential surface of the rod portion 420. Sealing rings 450 are respectively arranged on the two sides of the outlet of the liquid outlet channel 440 on the rod portion 420, and the brewing cavity 300 is provided with a liquid outlet 340. When the brewing cavity 300 moves to the third position, the outlet of the liquid outlet channel 440 directly faces the liquid outlet 340, and the sealing rings 450 abut against the wall of the brewing cavity. Referring to FIG. 3, a sealing cavity is formed among the outer peripheral surface of the rod portion 420, the wall of the brewing cavity and the two sealing rings 450. Through adopting the aforesaid design, the liquid coffee may flow out through the liquid outlet 340 formed in the brewing cavity 300, thus preventing the liquid coffee from spilling.

Figure 11:
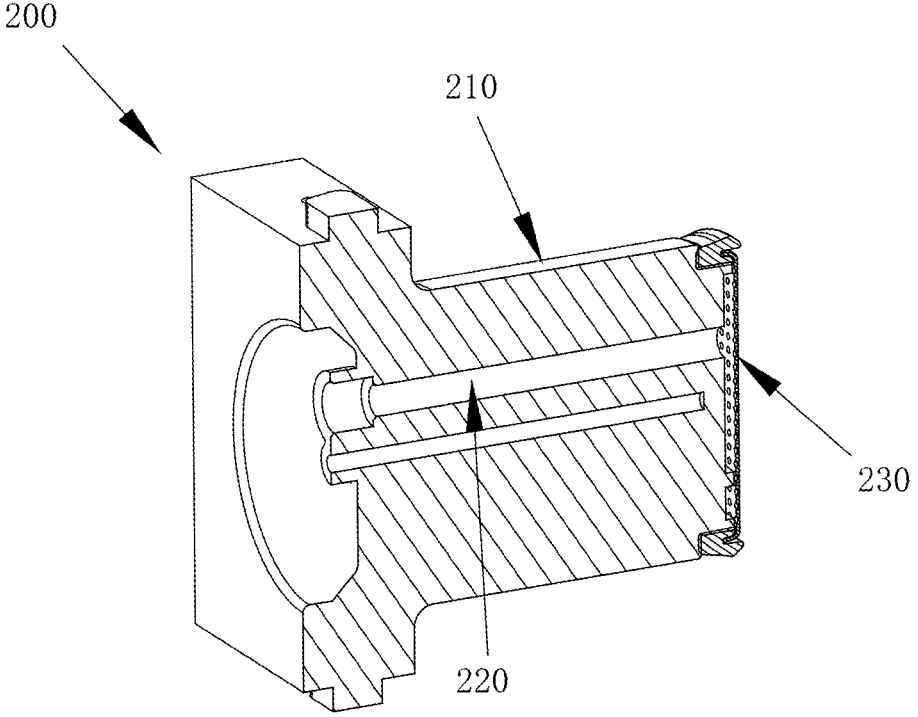
FIG. 11 is a conceptual diagram illustrating a sectional view of the brewing head assembly of the coffee brewing system of the present invention.

Corresponding to the structure of the powder pusher assembly 400, the brewing head assembly 200 comprises a second piston portion 210 capable of extending into the brewing cavity. One end of the second piston portion 210 is fixedly connected to the body 100, a hot water channel 220 is formed in the second piston portion 210, and the hot water channel 220 extends to an end surface of the other end of the second piston portion 210. Referring to FIG. 11, the end surface is provided with a second filter screen 230, and the second filter screen 230 is fixed to the second piston portion 210 by means of, for example, a piston fixing ring.

In this way, when the brewing head assembly 200 extends into the brewing cavity and interacts with the powder pusher assembly 400 to press the coffee powder, water is fed into the brewing cavity through the hot water channel 220. After passing through the second filter screen 230, the hot water is evenly fed into the pressed coffee powder. At this point, the coffee liquid enters the liquid outlet channel 440 after being filtered by the first filter screen 430 and finally flows out of the coffee brewing system. The arrangement of the liquid path in the coffee brewing system is reasonable and the structure is simple, achieving ideal coffee brewing effect.

Referring to FIGS. 3, 8 and 9, in some embodiments, a one-way valve 460 is arranged in the liquid outlet channel 440, and when the liquid pressure between the brewing head assembly 200 and the powder pusher assembly 400 reaches a preset threshold value, the one-way valve 460 is opened, which allows the liquid coffee to flow out through the liquid outlet channel 440. In this way, the coffee is brewed under a high pressure such that the brewing effect and the brewing speed are improved while preventing the liquid coffee from flowing back to the brewing cavity. More specifically, the one-way valve 460 comprises a sealing member 461, a ball valve 462 and a spring 463, wherein the sealing member 461 is arranged at the inlet of the liquid outlet channel 440. The sealing member 461 is provided with a liquid inlet hole and a sealing surface arranged around the liquid inlet hole. The ball valve 462 is arranged in the liquid outlet channel 440, and the spring 463 is connected between the ball valve 462 and the liquid outlet channel 440 for imposing an elastic force on the ball valve 462 towards the sealing surface, thereby enabling the ball valve 462 to abut against the sealing surface to seal the liquid inlet hole. On the contrary, the ball valve 462 can be opened under the liquid pressure such that the liquid inlet hole is exposed.

Figure 12:
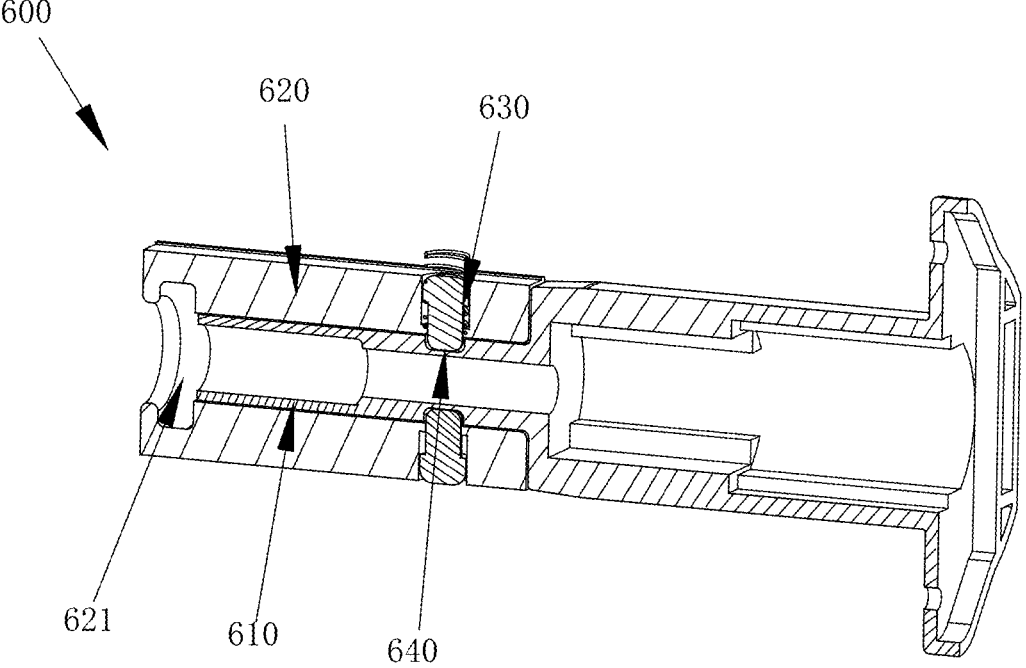
FIG. 12 is a conceptual diagram illustrating a sectional view of the sliding pull rod assembly of the coffee brewing system of the present invention.
Figure 13:
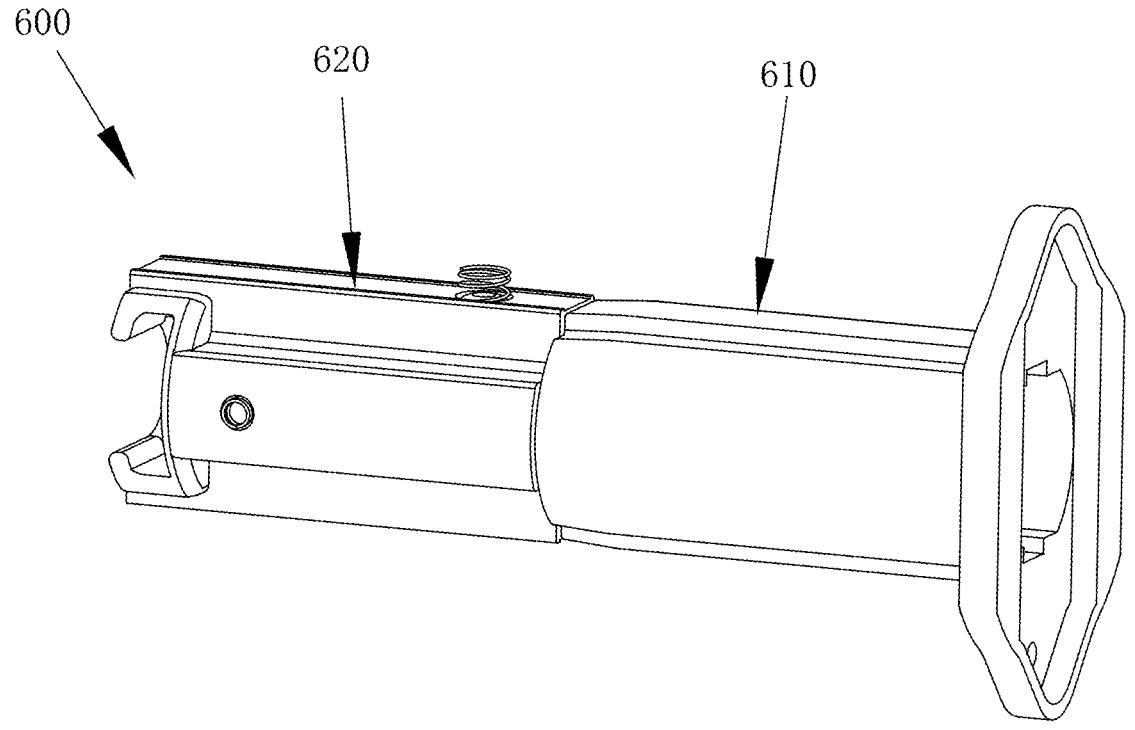
FIG. 13 is a conceptual diagram illustrating a three-dimensional structure of the sliding pull rod assembly of the coffee brewing system of the present invention.

In implementation, to enable the powder pusher assembly 400 and the body 100 to be locked to or unlocked from each other in time, various structures may be adopted. Referring to FIGS. 2, 12 and 13, in an embodiment, the coffee brewing system further comprises a sliding pull rod assembly 600. The sliding pull rod assembly 600 comprises a fixing frame 610 and a pull rod 620, wherein the fixing frame 610 is fixedly connected to the body 100, the pull rod 620 is connected to another end of the powder pusher assembly 400 and is slidably connected to the fixing frame 610. The pull rod 620 and the fixing frame 610 may be locked to or unlocked from each other. For example, the fixing frame 610 may be arranged in the inner cavity, and one end of the fixing frame 610 is fixedly connected to another end of the inner cavity. Another end of the fixing frame 610 may be provided with a guiding rod. The pull rod 620 is configured to be cylindrical and is sleeved on the guide rod, so that the pull rod 620 is capable of sliding along the guiding rod. A first locking mechanism is arranged between the pull rod 620 and the guiding rod for locking the pull rod 620 and the guiding rod, thereby enabling the powder pusher assembly 400 and the body 100 to be locked to or unlocked from each other in time. Definitely, in implementation, the first locking mechanism may also be arranged between the powder pusher assembly 400 and the body 100. Thus, the powder pusher assembly 400 and the body 100 can be directly locked to or unlocked from each other without the assistance of the sliding pull rod assembly 600.

In some embodiments, the first locking mechanism comprises an elastic locking pin 630 and a locking groove 640. One of the fixing frame 610 and the pull rod 620 is provided with an elastic locking pin 630, and the other of the fixing frame 610 and the pull rod 620 is provided with a locking groove 640. When the pull rod 620 slides relative to the fixing frame 610 to enable the locking pin to extend into the locking groove 640, the locking pin 630 and the locking groove 640 are locked to each other. When the brewing cavity 300 moves from the second position to the third position, the pull rod 620 is pulled by the powder pusher assembly 400 such that the elastic locking pin 630 escapes from the locking groove 640. Thus, the locking pin 630 and the locking groove 640 are unlocked from each other.

For example, the first locking mechanism comprises two groups of elastic locking pins 630, and each group of elastic locking pins 630 comprises two elastic locking pins 630. The two elastic locking pins 630 in one group are oppositely arranged on the pull rod 620 along a first straight line, and locking grooves 640 are correspondingly arranged on the guiding rod. The two elastic locking pins 630 in another group are arranged on the guiding rod along a second straight line, and locking pins are correspondingly arranged on the pull rod 620. The first straight line and the second straight line are perpendicular to each other.

When the brewing cavity 300 pulls the powder pusher assembly 400 to return to the second position, each elastic locking pin 630 is exactly aligned with the locking groove 640 and is capable of extending into the locking groove 640. Thus, the locking is achieved. Referring to FIG. 2, when the brewing cavity 300 pulls the powder pusher assembly 400 to move with a large pulling force, the brewing cavity 300 overcomes the elastic force of the elastic locking pin 630, so that the elastic locking pin 630 retracts and escapes from the locking groove 640. Thus, the pull rod 620 and the fixing frame 610 are unlocked from each other. Referring to FIG. 3, by means of the elastic locking pin 630 and the locking groove 640, the pull rod 620 and the fixing frame 610 are conveniently locked to or unlocked from each other, achieving a simple structure and high stability.

More specifically, the elastic locking pin 630 comprises a locking pin and a spring. Pin holes are formed in the pull rod 620 and the guide rod. One end of the locking pin extends into the pin hole, and another end of the locking pin is capable of extending out from the pin hole. The spring is arranged between the locking pin and the bottom of the pin hole, thereby imposing an elastic force on the locking pin to enable it to extend out from the locking hole.

Figure 14:
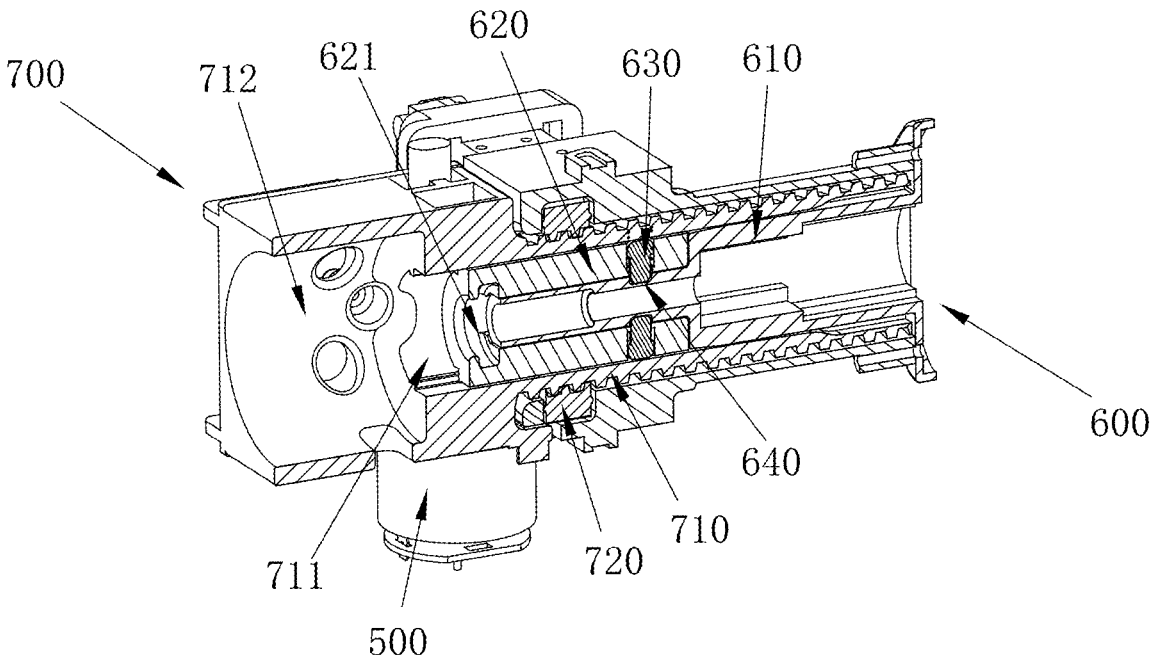
FIG. 14 is a conceptual diagram illustrating the connection between the lead screw assembly and the sliding pull rod assembly of the coffee brewing system of the present invention.

Referring to FIGS. 2, 3 and 14, in some embodiments, the driving device 500 is in transmission connection with the brewing cavity 300 through a lead screw assembly 700. The lead screw assembly 700 comprises a nut 720 and a lead screw 710 that are meshed with each other. The nut 720 is arranged in the inner cavity and is in transmission connection with the driving device 500, and the lead screw 710 is arranged in the inner cavity and connected to the brewing cavity 300. When the driving device 500 propels the nut 720 to rotate in the inner cavity, the lead screw 710 is propelled to linearly move in the inner cavity, thereby propelling the brewing cavity 300 to move linearly in the inner cavity. The screw assembly 700 is capable of stably propelling the brewing cavity 300 to move linearly.

In some embodiments, a lead screw cavity 711 penetrating through two ends of the lead screw 710 is formed in the lead screw 710. The fixing frame 610 and the pull rod 620 are arranged in the lead screw cavity 711. One end of the fixing frame 610 extends out from one end of the lead screw cavity 711 and is fixedly connected to the body 100, and another end of the powder pusher assembly 400 extends into the lead screw cavity 711 and is connected to the pull rod 620. Through arranging the lead screw cavity 711 in the lead screw 710, the sliding pull rod assembly 600 is conveniently arranged in the lead screw 710. Thus, the structure of the coffee brewing system becomes compact, the space occupation is reduced, and the size of the coffee machine becomes smaller.

Figure 15:
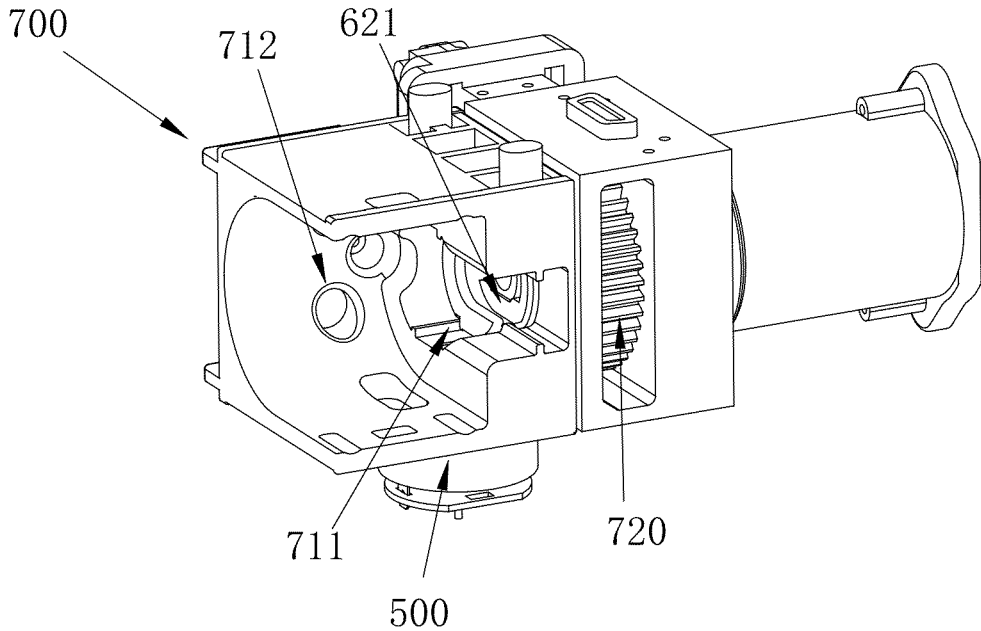
FIG. 15 is a conceptual diagram illustrating a three-dimensional structure of the lead screw assembly and the sliding pull rod assembly of the coffee brewing system of the present invention.

Referring to FIGS. 14 and 15, in some embodiments, one end of the lead screw 710 is provided with a first connecting portion 712, and another end of the pull rod 620 is provided with a second connecting portion 621. The first connecting portion 712 and the second connecting portion 621 are configured to be U-shaped. One end of the brewing cavity 300 having the second opening 320 is clamped in the first connecting portion 712, and another end of the powder pusher assembly 400 is clamped in the second connecting portion 621. A disassembly port is reserved on a side surface of the body 100 opposite to an opening of the first connection portion 712, which allows the brewing cavity 300 and the powder pusher assembly 400 to be conveniently removed. Therefore, the brewing cavity 300 is detachably connected to the lead screw 710, and the powder pusher assembly 400 is detachably connected to the pull rod 620. Through adopting the aforesaid design, the brewing cavity 300 and the powder pusher assembly 400 are capable of being removed regularly, achieving a convenient cleaning. Obviously, the brewing cavity 300 and the lead screw 710, as well as the powder pusher assembly 400 and the pull rod 620, may be connected via various detachable structures. In a preferred embodiment, the brewing cavity 300 is provided with a second locking mechanism capable of locking the first connecting portion 712 and the brewing cavity 300, which effectively prevents the brewing cavity 300 from being separated from the lead screw 710.

Figure 7:
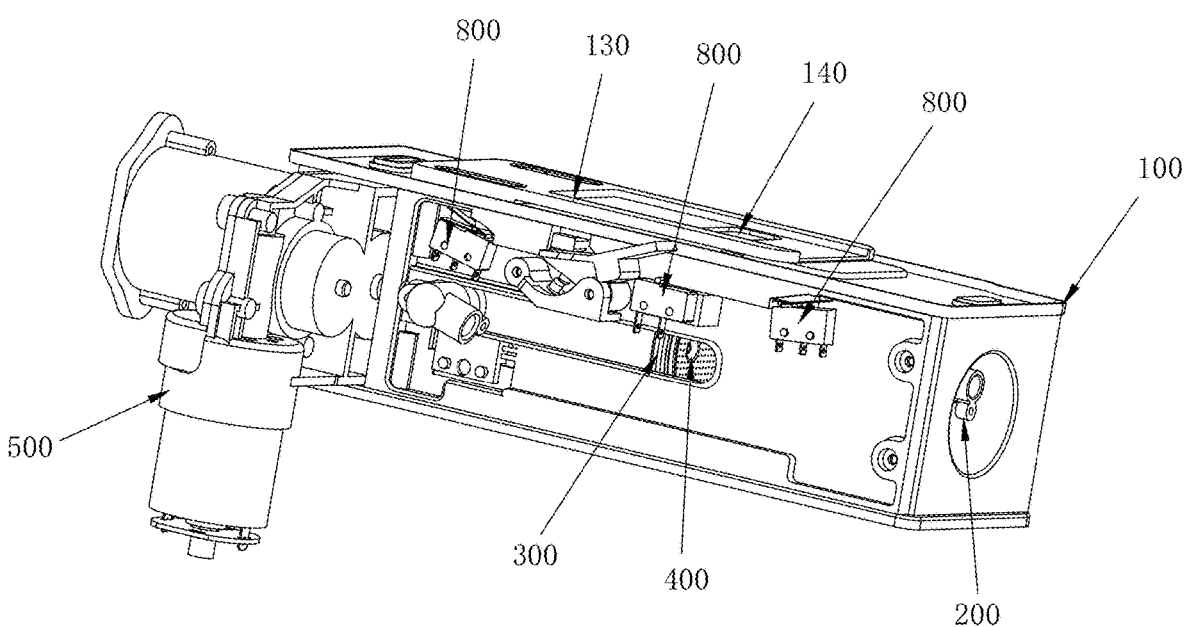
FIG. 7 is a conceptual diagram illustrating a three-dimensional structure of the coffee brewing system of the present invention from another viewing angle.

Referring to FIG. 7, in some embodiments, the coffee brewing system further comprises a controller (not shown) electrically connected to the driving device 500 and sensors 800 arranged to respectively correspond to the first position, the second position, and the third position. When the brewing cavity 300 moves to the first position, the second position or the third position, the corresponding sensor 800 sends a sensing signal to the controller, so that the driving device 500 is turned off by the controller. Through the arrangement of the controller and the sensors 800, the brewing process is automatically completed by the coffee brewing system, significantly improving the user experience. In implementation, the sensor may be a microswitch, a Hall sensor or an infrared sensor, etc.

Figure 4:
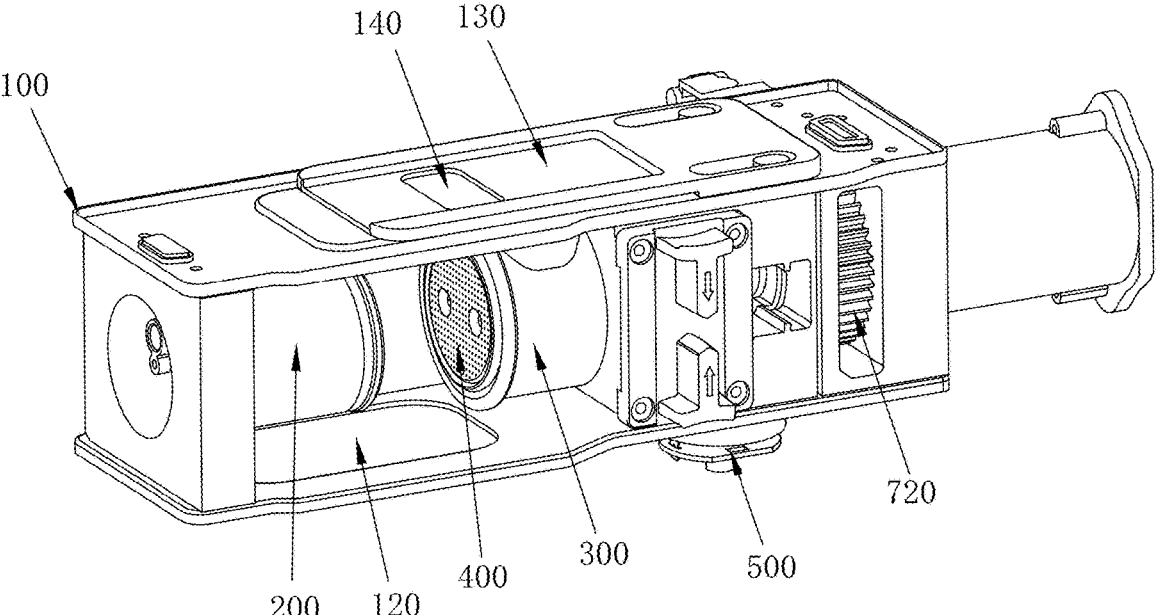
FIGS. 4-6 are respectively conceptual diagrams illustrating a three-dimensional structure of the coffee brewing system of the present invention when the brewing cavity is located at a first position, a second position and a third position.

Referring to FIGS. 4-6, in some embodiments, the body 100 may be a cuboid-shaped body 100. The body 100 comprises an upper support plate and a lower support plate that are arranged opposite to each other, and a side support plate arranged between the upper support plate and the lower support plate, thereby forming a cuboid-shaped inner cavity. The second powder receiving port 110 is formed in the upper support plate, and the residue discharging port 120 is formed in the lower support plate.

Referring to FIGS. 1-3, in some embodiments, the top of the body 100 is provided with a powder blocking plate 130, and a third powder receiving port is formed in the powder blocking plate 130. When the brewing cavity 300 moves, the powder blocking plate 130 moves along with the brewing cavity 300, and when the brewing cavity 300 moves to the second position, the third powder receiving port 140 is opposite to the second powder receiving port 110 and the first powder receiving port 330. After the brewing cavity 300 is moved away from the second position, the powder blocking plate 130 blocks the second powder receiving port 110, thereby preventing the coffee powder from caking due to the steam entering the powder discharging channel of the coffee machine through the first powder receiving port during in the brewing process. More specifically, the powder blocking plate 130 is arranged at the top of the upper support plate, and the upper support plate is provided with a strip-shaped hole in communication with the inner cavity. The strip-shaped hole is parallel to the moving direction of the brewing cavity 300. The top of the lead screw 710 is provided with a column pin. The column pin passes through the strip-shaped hole and is connected to the powder blocking plate 130. When the lead screw 710 propels the brewing cavity 300 to move, the powder blocking plate 130 is propelled to synchronously move through the column pin.

The present invention also provides a coffee machine having a coffee brewing system of any aforesaid embodiments. The structure of the coffee brewing system is simple, the cost is low and the stability is high. The coffee machine having the aforesaid coffee brewing system possesses these merits as well.

The above are merely exemplary embodiments of the present invention, which are not intended to limit the present invention. The scope of the present invention is defined by the claims. For those skilled in the art, modifications or equivalent replacements may be made within the spirit of the present invention, and these modifications or equivalent replacements shall therefore fall into the scope of the present invention.

The invention claimed is:

1. A coffee brewing system, comprising:
a body,
a brewing head assembly,
a brewing cavity assembly, and
a driving device,
wherein the body has an inner cavity, and the brewing head assembly is fixed at one end of the inner cavity,
wherein the brewing cavity assembly comprises a brewing cavity and a powder pusher assembly,
wherein the brewing cavity is movably arranged in the inner cavity and is in transmission connection with the driving device, and two opposite ends of the brewing cavity are respectively provided with a first opening and a second opening connected with the interior of the brewing cavity, wherein the first opening is opposite to the brewing head assembly, and the top of the brewing cavity is provided with a first powder receiving port connected with the brewing cavity,
wherein the powder pusher assembly has one end extending into the brewing cavity from the second opening, and the other end extending out of the brewing cavity and connected to the body, wherein the powder pusher assembly and the body may be locked to or unlocked from each other,
wherein along the moving direction, the brewing cavity in the inner cavity is provided with a first position for discharging coffee residue, a second position for receiving powder, and a third position for brewing coffee,
wherein in the first position, one end of the powder pusher assembly is adjacent to the first opening, in the second position, the brewing head assembly is adjacent to the first opening, and in the third position, the brewing head assembly extends into the brewing cavity and is adjacent to the powder pusher assembly;
wherein the top of the body is provided with a second powder receiving port connected with the inner cavity, and a powder blocking plate; wherein a third powder receiving port is formed in the powder blocking plate; wherein when the brewing cavity moves, the powder blocking plate moves along with the brewing cavity; and wherein when the brewing cavity moves to the second position, the third powder receiving port is opposite to the second powder receiving port and the first powder receiving port.

2. The coffee brewing system of claim 1, wherein when the brewing cavity moves between the first position and the second position, the powder pusher assembly and the body are locked to each other, and wherein when the brewing cavity moves between the second position and the third position, the brewing cavity propels the powder pusher assembly to move causing the powder pusher assembly and the body to be unlocked from each other.

3. The coffee brewing system of claim 2, wherein the coffee brewing system further comprises a sliding pull rod assembly, wherein the sliding pull rod assembly comprises a fixing frame and a pull rod, wherein the fixing frame is fixedly connected to the body, and the pull rod is connected to another end of the powder pusher assembly and is slidably connected to the fixing frame, wherein the pull rod and the fixing frame are capable of being locked to or unlocked from each other, wherein through the locking and unlocking between the pull rod and fixing frame, the powder pusher assembly and the body are locked to or unlocked from each other.

4. The coffee brewing system of claim 3, wherein the pull rod is provided with an elastic locking pin, and the fixing frame is provided with a locking groove, wherein when the pull rod slides relative to the fixing frame to enable the locking pin to extend into the locking groove, the locking pin and the locking groove are locked to each other, and wherein when the pull rod is pulled by the powder pusher assembly, the elastic locking pin escapes from the locking groove causing the locking pin and the locking groove to be unlocked from each other.

5. The coffee brewing system of claim 3, wherein the driving device is in transmission connection with the brewing cavity through a lead screw assembly, wherein the lead screw assembly comprises a nut and a lead screw meshed with each other, wherein the nut is arranged in the inner cavity and is in transmission connection with the driving device, and the lead screw is arranged in the inner cavity and connected to the brewing cavity, wherein when the driving device propels the nut to rotate in the inner cavity, the lead screw is propelled to linearly move in the inner cavity, thereby propelling the brewing cavity to move linearly in the inner cavity.

6. The coffee brewing system of claim 5, wherein a lead screw cavity penetrating through two ends of the lead screw is formed in the lead screw, wherein the fixing frame and the pull rod are arranged in the lead screw cavity, wherein one end of the fixing frame extends out from one end of the lead screw cavity and is fixedly connected to the body, and another end of the powder pusher assembly extends into the lead screw cavity and is connected to the pull rod.

7. The coffee brewing system of claim 2, wherein the powder pusher assembly comprises a first piston portion and a rod portion, wherein the first piston portion is arranged in the brewing cavity, wherein the diameter of the first piston portion is greater than the diameter of the second opening, wherein one end of the rod portion extends into the brewing cavity and is connected to the first piston portion, and another end of the rod portion extends out of the brewing cavity and is connected to the body.

8. The coffee brewing system of claim 7, wherein the powder pusher assembly is provided with a liquid outlet channel, wherein an inlet of the liquid outlet channel is formed in an end surface of the first piston portion facing the brewing head assembly, and an outlet of the liquid outlet channel is formed in the circumferential surface of the rod portion, wherein sealing rings are respectively arranged on two sides of the outlet of the liquid outlet channel on the rod portion, and the brewing cavity is provided with a liquid outlet, wherein when the brewing cavity moves to the third position, the outlet of the liquid outlet channel directly faces the liquid outlet, and the sealing rings abut against the wall of the brewing cavity.

9. The coffee brewing system of claim 8, wherein a one-way valve is arranged in the liquid outlet channel, wherein when the liquid pressure between the brewing head assembly and the powder pusher assembly reaches a predetermined threshold value, the one-way valve is opened.

10. The coffee brewing system of claim 1, wherein the coffee brewing system further comprises sensors arranged to respectively correspond to the first position, the second position, and the third position.

11. A coffee machine, comprising the coffee brewing system of claim 1.

12. A coffee machine, comprising the coffee brewing system of claim 2.

13. A coffee machine, comprising the coffee brewing system of claim 3.

14. A coffee machine, comprising the coffee brewing system of claim 4.

15. A coffee machine, comprising the coffee brewing system of claim 5.

16. A coffee machine, comprising the coffee brewing system of claim 6.

17. A coffee machine, comprising the coffee brewing system of claim 7.

18. A coffee machine, comprising the coffee brewing system of claim 8.

19. A coffee machine, comprising the coffee brewing system of claim 9.

* * * * *